(12) United States Patent
Wakimoto (10) Patent No.: US 11,050,102 B2
(45) Date of Patent: Jun. 29, 2021

(54) POWER STORAGE DEVICE AND INSULATING HOLDER

(71) Applicant: SANYO Electric Co., Ltd., Daito (JP)

(72) Inventor: Ryoichi Wakimoto, Hyogo (JP)

(73) Assignee: SANYO Electric Co., Ltd., Daito (JP)

( * ) Notice: Subject to any disclaimer, the term of this patent is extended or adjusted under 35 U.S.C. 154(b) by 56 days.

(21) Appl. No.: 16/043,386

(22) Filed: Jul. 24, 2018

(65) Prior Publication Data

US 2019/0036088 A1 Jan. 31, 2019

(30) Foreign Application Priority Data

Jul. 31, 2017 (JP) .............................. JP2017-148234

(51) Int. Cl.
*H01M 50/116* (2021.01)
*H01M 10/0585* (2010.01)
(Continued)

(52) U.S. Cl.
CPC .......... *H01M 50/116* (2021.01); *H01G 9/048* (2013.01); *H01G 9/08* (2013.01); *H01G 11/78* (2013.01); *H01G 11/82* (2013.01); *H01M 10/0525* (2013.01); *H01M 10/0585* (2013.01); *H01M 50/10* (2021.01);
(Continued)

(58) Field of Classification Search
CPC ...... H01M 2/029; H01M 2/0287; H01M 2/00; H01M 2/0277; H01M 9/08; H01M 2/024; H01M 2/0262; H01M 2/18; H01M 10/0525; H01M 10/0585; H01M 50/103; H01M 50/466; H01M 50/474; H01M 50/477;
(Continued)

(56) References Cited

U.S. PATENT DOCUMENTS

2015/0340663 A1\* 11/2015 Minagata .......... H01M 10/0413
429/163
2015/0357607 A1\* 12/2015 Tsutsumi ............... H01G 11/66
429/177
2017/0047571 A1\* 2/2017 Iwasaki .................... H01M 2/18

FOREIGN PATENT DOCUMENTS

| JP | 2010-287456 A | | 12/2010 | |
| JP | 2015125904 A | \* | 7/2015 | ........ H01M 10/0413 |
| JP | 2016115407 A | \* | 6/2016 | |

OTHER PUBLICATIONS

JP-2015125904-A English machine translation (Year: 2020).\*
JP-2016115407-A English machine translation (Year: 2020).\*

\* cited by examiner

*Primary Examiner* — Ula C Ruddock
*Assistant Examiner* — Armindo Carvalho, Jr.
(74) *Attorney, Agent, or Firm* — Westerman, Hattori, Daniels & Adrian, LLP (57) ABSTRACT

A power storage device includes an electrode body, an insulating holder, and an outer case. The insulating holder is formed by folding a sheet formed of an insulating material. The insulating holder has an interposed wall interposed between a side end surface of the electrode body and the outer case. The interposed wall has a first facing region that faces a curved surface of a corner portion of the outer case and a second facing region that faces a portion away from the curved surface toward an opening. Each of the first facing region and the second facing region has a plurality of overlap sections in which some of sheet elements that form the sheet overlap each other. The number of the overlapping sheets is larger in the overlap section arranged in the second facing region than in the overlap section arranged in the first facing region.

10 Claims, 9 Drawing Sheets

(51) Int. Cl.
*H01M 10/0525* (2010.01)
*H01M 50/10* (2021.01)
*H01M 50/463* (2021.01)
*H01M 50/474* (2021.01)
*H01M 50/477* (2021.01)
*H01G 9/08* (2006.01)
*H01G 9/048* (2006.01)
*H01G 11/82* (2013.01)
*H01G 11/78* (2013.01)
*H01M 50/103* (2021.01)

(52) U.S. Cl.
CPC ....... *H01M 50/103* (2021.01); *H01M 50/463* (2021.01); *H01M 50/474* (2021.01); *H01M 50/477* (2021.01)

(58) Field of Classification Search
CPC .......... H01G 9/048; H01G 9/08; H01G 11/78; H01G 11/82
See application file for complete search history.

POWER STORAGE DEVICE AND INSULATING HOLDER

CROSS REFERENCE TO RELATED APPLICATIONS

The present invention application claims priority to Japanese Patent Application No. 2017-148234 filed in the Japan Patent Office on Jul. 31, 2017, the entire contents of which are incorporated herein by reference.

BACKGROUND OF THE INVENTION

Field of the Invention

The present disclosure relates to a power storage device and an insulating holder.

Description of Related Art

Recently, attention has been paid to the use of a power storage device such as a secondary battery and a capacitor as a drive power source for a vehicle such as an electric vehicle (EV) and a hybrid electric vehicle (HEV). In such a power storage device, a metal case that is formed of aluminum or the like is sometimes used as an outer case from a point of view of mechanical strength. When the metal case comes into contact with an electrode body housed in the metal case, there is a possibility that a short circuit of a positive electrode and a negative electrode in the electrode body may occur. To prevent such a short circuit, it is conceivable to interpose an insulating holder between the electrode body and the metal case by housing the electrode body in the insulating holder that is folded into a bag shape and housing the electrode body together with the insulating holder in the metal case.

Japanese Published Unexamined Patent Application No. 2010-287456 (Patent Document 1) discloses a technology that improves ease of inserting an insulating holder into a metal case by using, as the insulating holder, a space in a bag-shaped film and reducing the internal space of the film such that the space is smaller on the bottom surface side of the metal case than on the opening side of the case.

The insulating holder described in Patent Document 1 may improve ease of insertion into the case. However, when the metal case is manufactured by molding, a curved surface is easily formed at a connection portion of a corner portion that connects ends of a plurality of inner surfaces to each other because the connection is not surface-to-surface connection.

When the insulating holder and the electrode body are housed in the metal case, and an edge portion of the insulating holder is thereby brought into contact with the curved surface, there is a possibility that a stress that is applied by the curved surface through the edge portion may be concentrated on the electrode body, which may cause stress concentration.

BRIEF SUMMARY OF THE INVENTION

According to the present disclosure, there is provided a power storage device and an insulating holder capable of suppressing stress concentration in an electrode body when the insulating holder and an electrode body are housed in an outer case, and an edge portion of the insulating holder is thereby brought into contact with a curved surface of a corner portion of the outer case.

A power storage device according to one aspect of the present disclosure includes an electrode body that includes at least one positive electrode plate and at least one negative electrode plate that are stacked on each other via a separator; an insulating holder that is formed by folding a sheet formed of an insulating material and that houses the electrode body; and an outer case that houses the electrode body together with the insulating holder and an electrolytic solution. The outer case includes a bottom plate portion, a plurality of side walls that extend vertically from the bottom plate portion, and an opening formed at an end opposite to the bottom plate portion. A corner portion that connects an inner surface of one side wall of the plurality of side walls and an inner surface of the bottom plate portion to each other has a curved surface. The electrode body has a side end surface that is parallel to a stacking direction and that faces the one side wall via the insulating holder. The insulating holder has an interposed wall interposed between the side end surface and the outer case. The interposed wall has a first facing region that faces the curved surface of the corner portion of the one side wall and a second facing region that faces a portion of the one side wall, the portion being away from the curved surface toward the opening. The sheet includes a plurality of sheet elements. Each of the first facing region and the second facing region has a plurality of overlap sections in which some of the plurality of sheet elements overlap each other. The plurality of the overlap sections include an overlap section arranged in the first facing region and an overlap section arranged in the second facing region, and the number of the sheet elements that overlap each other is larger in the overlap section arranged in the second facing region than in the overlap section arranged in the first facing region.

An insulating holder according to one aspect of the present disclosure is formed by folding a sheet that is formed of an insulating material, the sheet including a plurality of sheet elements. The insulating holder includes a bottom surface part and a plurality of side surface parts that extend vertically from the bottom surface part. A holder opening surrounded by ends of the side surface parts is formed at an end of the insulating holder opposite to the bottom surface part. At least one of the plurality of side surface parts includes a first overlap section in which the plurality of sheet elements overlap each other and a second overlap section in which a larger number of the sheet elements overlap each other than in the first overlap section. The first overlap section is arranged adjacent to the bottom surface part. The second overlap section is arranged closer than the first overlap section to the holder opening.

According to one aspect of the present disclosure, it is possible to suppress stress concentration in an electrode body when an insulating holder and an electrode body are housed in an outer case, and an edge portion of the insulating holder is thereby brought into contact with a curved surface of a corner portion of the outer case.

DETAILED DESCRIPTION OF THE INVENTION

Hereinafter, a power storage device and an insulating holder according to a first embodiment will be described in detail. The drawings referred in the description of the embodiments are schematic illustrations. Therefore, the dimensional ratio and the like of each component illustrated in the drawings may differ from the actual dimensional ratio. Each specific dimensional ratio and the like should be determined by referring to the following description. In the present specification, the wording "substantially", for example, "substantially identical" means, as well as "completely identical", "identical" that is considered to be practically identical. In addition, the term "end" means an end of an object and a portion in the vicinity of the end". Moreover, shapes, materials, the number, and the like described below are examples for description and may be changed depending on the specifications of the power storage device. In the following description, the same components will be denoted by the same reference characters.

A power storage device to be described below is for use in, for example, a driving power source for an electric vehicle or a hybrid vehicle, or a stationary power storage system for peak-shifting of system power.

Figure 1:
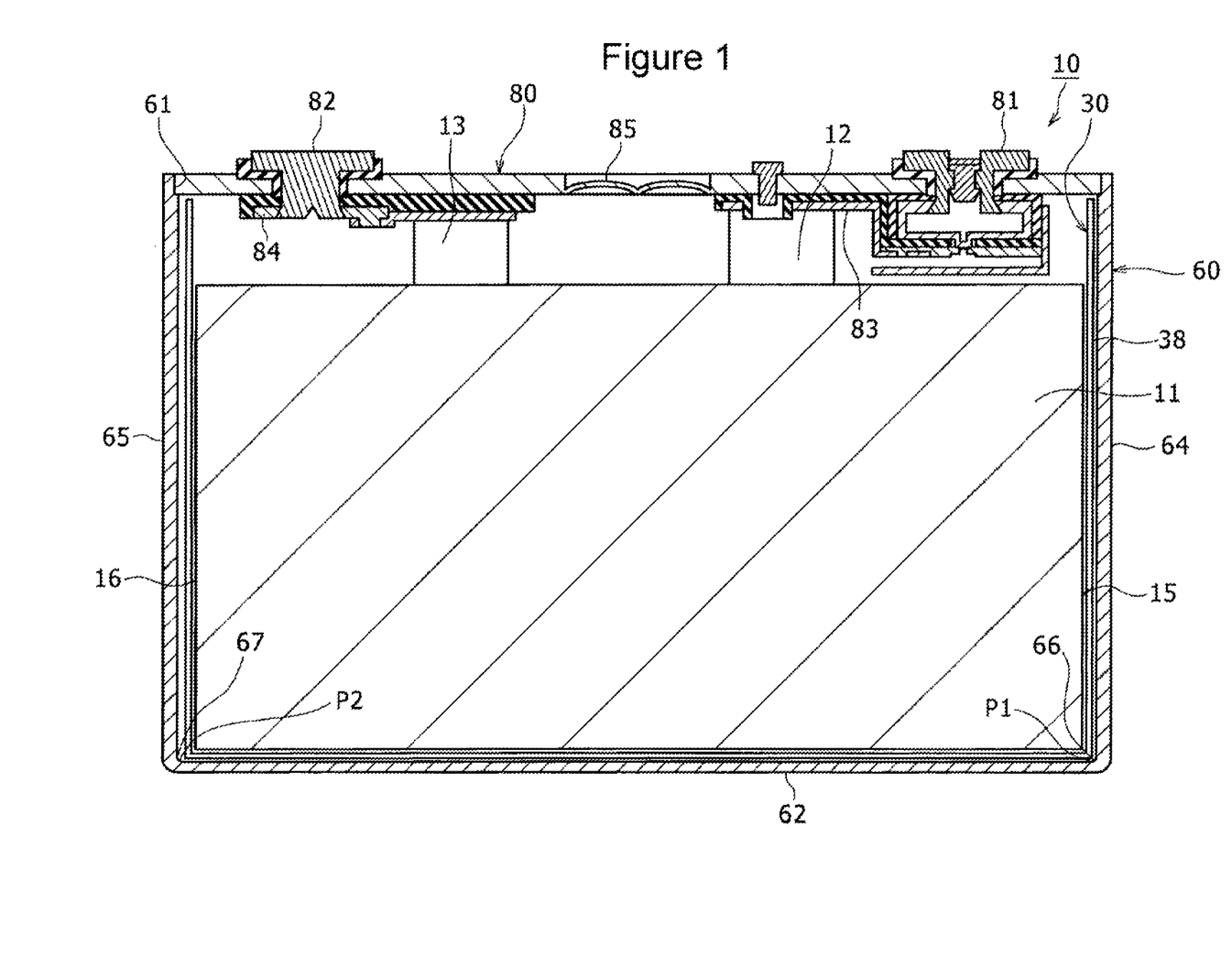
FIG. 1 is a sectional view of a power storage device according to a first embodiment.
Figure 2:
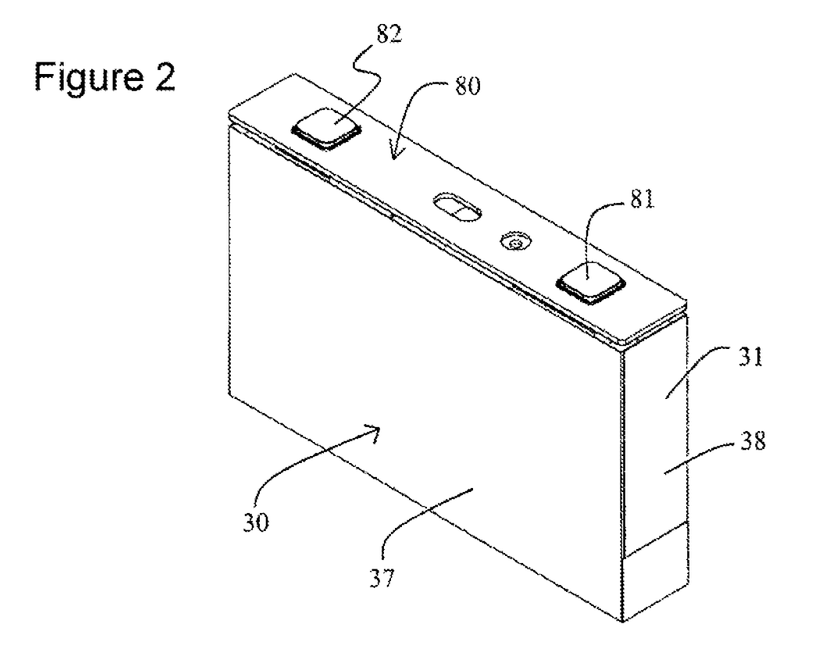
FIG. 2 is a perspective view of the power storage device illustrated in FIG. 1 from which an outer case is removed.
Figure 3:
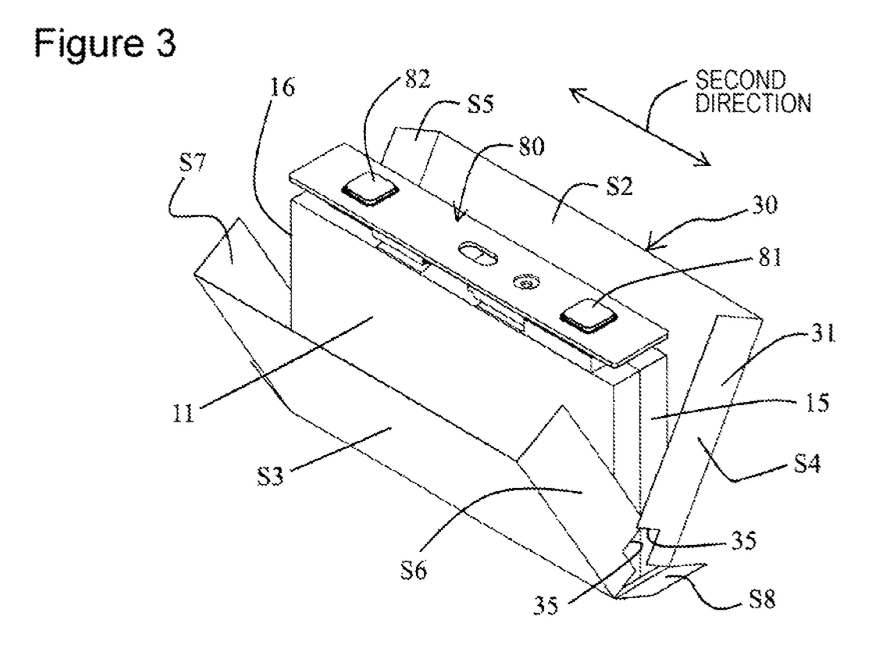
FIG. 3 is a perspective view illustrating a state in which the insulating holder in FIG. 2 is in the middle of assembling thereof.

With reference to FIGS. 1 to 8, a power storage device 10 and an insulating holder 30 according to the first embodiment will be described below in detail. FIG. 1 is a sectional view of the power storage device 10. FIG. 2 is a perspective view of the power storage device 10 illustrated in FIG. 1 from which an outer case 60 is removed. FIG. 3 is a perspective view illustrating a state in which the insulating holder 30 in FIG. 2 is in the middle assembling thereof. In the following description, the side of the outer case 60 where a sealing plate 80 is present and the side thereof opposite to the side where the sealing plate 80 is present are referred to as the upper side and the lower side, respectively, for convenience of description.

As illustrated in FIG. 1, the power storage device 10, which is a non-aqueous electrolyte secondary battery, includes an electrode body 11 as a power generating element, the insulating holder 30 that houses the electrode body 11, the outer case 60, and the sealing plate 80. The electrode body 11 includes a positive electrode and a negative electrode that are stacked on each other with a separator interposed therebetween. The insulating holder 30 has a substantially rectangular parallelepiped shape having a bottom and an open upper end. The insulating holder 30 houses the electrode body 11. The outer case 60 has a substantially rectangular parallelepiped shape having a bottom and an open upper end. The outer case 60 houses the electrode body 11 and the insulating holder 30 together with an electrolytic solution (not illustrated) corresponding to the non-aqueous electrolyte. The sealing plate 80 closes an opening 61 of the outer case 60. A positive electrode terminal 81 and a negative electrode terminal 82 protrude from the sealing plate 80. The positive electrode terminal 81 and the negative electrode terminal 82 are separated from each other in the longitudinal direction (right-left direction in FIG. 1) of the sealing plate 80.

The electrode body 11 includes a plurality of positive electrode plates and a plurality of negative electrode plates that are alternately stacked, and separators. The electrode body 11 has a stacked structure in which the positive electrode plates and the negative electrode plates are alternately stacked via the separators.

Porous sheets having ion permeability and insulation properties are used as the separators. One suitable example of the power storage device 10 is a lithium-ion battery.

The electrode body 11 includes positive electrode leads 12 and negative electrode leads 13 that each extend from an end surface thereof present on the side where the insulating holder 30 is open. The positive electrode leads 12 are electrically connected via a power collecting member 83 to the positive electrode terminal 81 that is disposed on the sealing plate 80. The negative electrode leads 13 are electrically connected via a power collecting member 84 to the negative electrode terminal 82 that is disposed on the sealing plate 80.

The positive electrode plates, the negative electrode plates, and the separators are substantially rectangular sheets. The electrode body 11 is formed by stacking these substantially rectangular sheets. The electrode body 11 has end surfaces opposite to each other in a stacking direction and side surfaces in four directions. The side surfaces are present between these end surfaces and surround the end surfaces.

A fixing tape may be used to bind the stack of the positive electrode plates, the negative electrode plates, and the separators. In addition, an adhesive agent may be applied on surfaces of the separators that face the positive electrode plates or the negative electrode plates, to bond and fix the positive electrode plates or the negative electrode plates to the separators.

A plurality of rectangular sheets of at least one of each positive electrode plate, each negative electrode plate, and each separator may be substituted by a belt-shaped sheet, and the belt-shaped sheet is turned and folded into a zigzag shape to form the electrode body.

Each positive electrode plate includes, for example, a core body formed of an aluminum foil having a thickness of 15 μm, electrode layers formed on front and rear surfaces, a core-body exposure portion, which is a portion of the core body where no electrode layer is formed, and the positive electrode lead 12, which is a portion of the core-body exposure portion, the positive electrode lead 12 extending from an upper end of the core-body exposure portion.

The electrode layers of the positive electrode contain, for example, an active material, a conductive agent, and a binding agent. The positive electrode may contain a lithium-nickel-cobalt-manganese composite oxide as the active material, polyvinylidene fluoride (PVdF) as the binding agent, a carbon material as the conductive agent, and N-methyl pyrrolidone (NMP) as a dispersion medium. Each electrode layer is formed by producing a slurry that contains the active material, the conductive agent, the binding agent, and the dispersion medium, applying the slurry on both surfaces of the core body of the positive electrode, and drying the slurry to remove the dispersion medium in the slurry such that an electrode layer is formed on the core body. Then, the electrode layer is pressed to a predetermined thickness to obtain a positive electrode plate. The thus obtained positive electrode plate is cut into a predetermined shape.

Each negative electrode plate includes, for example, a core body formed of a copper foil having a thickness of 8 µm, electrode layers formed on front and rear surfaces of the core body, a core-body exposure portion, which is a portion of the core body where no electrode layer is formed, and the negative electrode lead 13, which is a portion of the core-body exposure portion, the negative electrode lead 13 extending from an upper end of the core-body exposure portion.

The electrode layers of the negative electrode contain, for example, an active material, a conductive agent, a binding agent, and a thickening agent. The negative electrode may contain graphite as the active material, styrene-butadiene rubber (SBR) as the binding agent, carboxymethyl cellulose (CMC) as the thickening agent, and water as a dispersion medium. Each electrode layer is formed by producing a slurry that contains the active material, the conductive agent, the binding agent, and the thickening agent, applying the slurry on both surfaces of the core body of the negative electrode, and drying the slurry to remove the dispersion medium in the slurry such that an electrode layer is formed on the core body. Then, the electrode layer is pressed to a predetermined thickness to obtain a negative electrode plate. The thus obtained negative electrode plate is cut into a predetermined shape.

The separators may be formed of, for example, a resin such as a polyolefin resin, a polyethylene resin, or a polypropylene resin.

In a plan view in the stacking direction of the positive electrode plates and the negative electrode plates that face each other via the separators in the electrode body 11, each negative electrode plate excluding the lead 13 may be larger than each positive electrode plate excluding the lead 12, and the peripheral edge of each positive electrode plate may be positioned inside the peripheral edge of each negative electrode plate. According to such a configuration, it is possible to suppress deposition of lithium ions on the negative electrode plates.

The number of the leads 12 and the number of the leads 13 correspond to the number of the positive electrode plates and the number of the negative electrode plates, respectively, that form the electrode body 11. A plurality of the leads 12 that are bound together at the extend-direction leading ends thereof are joined to the power collecting member 83, and a plurality of the leads 13 that are bound together at the extend-direction leading ends thereof are joined to the power collecting member 84. The leads 12 and 13 may be joined to the respective power collecting members 83 and 84 by ultrasonic welding, resistance welding, laser welding, cold-pressure welding, or the like. To suppress melting down and breaking of the leads 12 and 13 during joining thereof, a conductive protection plate (not illustrated) may be additionally used, and joining processing is performed in a direction from the protection plate to the lead 12 or 13 in a state in which the lead 12 or 13 is interposed between the protection plate and the power collecting member 83 or 84.

The power collecting member 83 of the positive electrode is formed of, for example, an aluminum plate material. The power collecting member 83 is connected at one end thereof to the positive electrode leads 12 and connected at the other end thereof to the positive electrode terminal 81. The positive electrode terminal 81 and the power collecting member 83 may be electrically connected to each other via a current breaker. The current breaker is a safety device capable of breaking the electrical connection between the power collecting member 83 and the positive electrode terminal 81 when a gas is generated inside the outer case 60 in the power storage device 10 in its abnormal state and if the pressure inside the outer case 60 exceeds a predetermined pressure. The current breaker includes, for example, a reversing plate and a conductive cap. The reversing plate is connected to the other end of the power collecting member 83. The reversing plate is deformed in a direction away from the power collecting member 83 when receiving the pressure inside the outer case 60. The conductive cap electrically connects the reversing plate and the positive electrode terminal 81 to each other. The conductive cap is a disc-shaped conductive member having an opening on the lower side (the side where the electrode body 11 is present) and an upper surface at the upper side (the side where the sealing plate 80 is present). The upper surface has a connection hole into which the positive electrode terminal 81 is inserted.

The power collecting member 84 of the negative electrode is formed of, for example, a copper plate material. The power collecting member 84 is connected at one end thereof to the negative electrode leads 13 and connected at the other end thereof to the negative electrode terminal 82. The power collecting member 84 may be fixed (described later in detail) to the sealing plate 80 by, for example, the negative electrode terminal 82.

Each of the power collecting members 83 and 84 may be a single member or may be formed by a plurality of members connected together.

The positive electrode terminal 81 passes through a terminal hole of the sealing plate 80 and has one end exposed to the outside of the outer case 60 and the other end housed in the outer case 60. The other end of the positive electrode terminal 81 is inserted into the connection hole provided in the upper surface of the conductive cap. When the other end of the positive electrode terminal 81 is crimped so as to be widened in a radial direction, the positive electrode terminal 81 is fixed to the conductive cap. The positive electrode terminal 81 is formed by, for example, an aluminum cylindrical body.

The negative electrode terminal 82 passes through a terminal hole of the sealing plate 80 and has one end exposed to the outside of the outer case 60 and the other end housed in the outer case 60. The other end of the negative electrode terminal 82 is connected to the power collecting member 84 in the outer case 60. The other end may be formed of, for example, a copper material. The one end of the negative electrode terminal 82, which is exposed to the outside of the outer case 60, may be formed of, for example, an aluminum clad material. When the other end of the negative electrode terminal 82 is crimped so as to be widened in the radial direction, the negative electrode terminal 82 is fixed to the sealing plate 80 together with the power collecting member 84.

The sealing plate 80 is formed by, for example, processing an aluminum plate. The sealing plate 80 is positioned above the opening 61 of the outer case 60. The sealing plate 80 is capable of hermetically sealing the outer case 60 by being welded (for example, laser welding) to the open end of the outer case 60. The sealing plate 80 may have a liquid injection hole for injecting the electrolytic solution into the outer case 60. The sealing plate 80 may include a liquid injection plug that closes the liquid injection hole. In addition, the sealing plate 80 may include a pressure regulating valve 85 that is formed by being surrounded by a plurality of line-shaped grooves. When the pressure inside the outer case 60 exceeds a predetermined pressure, the grooves are torn to cause the gas inside the outer case 60 to be exhausted to the outside. An annular groove is preferably formed at the peripheral edge of the sealing plate 80. Such a configuration enables efficient melting of the peripheral edge of the sealing plate 80 during welding and joining the sealing plate 80 and the opening of the outer case 60 to each other.

When the power collecting members 83 and 84 are fixed directly or indirectly to the sealing plate 80 by crimping the positive electrode terminal 81 and the negative electrode terminal 82, an insulating member may be interposed between the power collecting member 83 and the sealing plate 80. In addition, an insulating member may be interposed between the respective terminal holes and the positive electrode terminal 81 and the negative electrode terminal 82 and between the upper surface of the sealing plate 80 and respective head portions, which are exposed above the sealing plate 80, of the positive electrode terminal 81 and the negative electrode terminal 82.

The outer case 60 is, for example, a flat substantially box-shaped rectangular case having a bottom and an open upper end. The outer case 60 is formed of, for example, a metal such as aluminum. The outer case 60 is formed by, for example, drawing an aluminum material. The outer case 60 includes a bottom plate portion 62, a plurality of side walls vertically extending from the peripheral edge of the bottom plate portion 62, and the opening 61 formed at an end thereof opposite to the bottom plate portion 62. The plurality of side walls of the outer case 60 are formed by two short side-walls 64 and 65 that are short in lateral length and two long side-walls (not illustrated) that are long in lateral length. Each of the long side-walls faces one of end surfaces in the stacking direction of the electrode body 11 via the insulating holder 30 (described later). Each of the short side-walls 64 and 65 faces, via the insulating holder 30, side end surface 15 or 16. The side end surfaces 15 and 16 are perpendicular to the end surfaces in the stacking direction of the electrode body 11. Corner portions P1 and P2 connect an inner surface of the bottom plate portion 62 of the outer case 60 to an inner surface of the short side-wall 64 and an inner surface of the short side-wall 65, respectively. The corner portions P1 and P2 have curved surfaces 66 and 67, respectively. The relationship between the lateral lengths of the perpendicularly adjacent two side walls of the outer case 60 in the present embodiment may be reversed. The curved surfaces 66 and 67 each have a sectional shape of, for example, a circular arc. The range of the R dimension of each of the curved surfaces 66 and 67 is, for example, 0.5 mm or more and 3 mm or less and preferably, 1 mm or more and 2 mm or less. The R dimension of each of the side walls and the corner portions extending in a direction parallel to the bottom plate portion may not be uniform throughout in the same direction.

The electrode body 11 has the side end surfaces 15 and 16 that are parallel to the stacking direction. The side end surfaces 15 and 16 respectively face the short side-walls 64 and 65 of the outer case 60 via the insulating holder 30.

Figure 4:
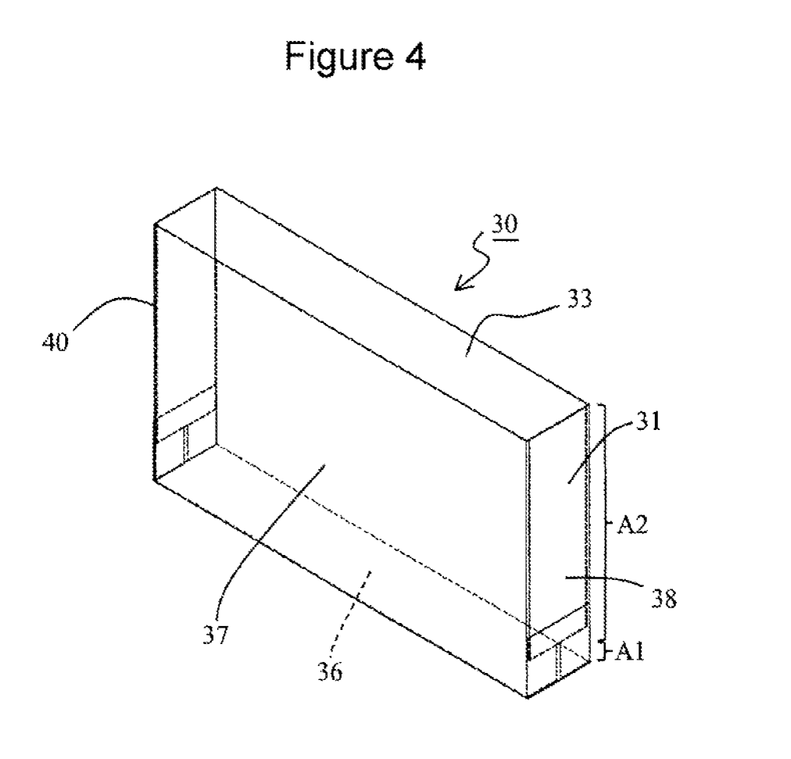
FIG. 4 is a perspective view illustrating an assembled state of the insulating holder according to the first embodiment.
Figure 5A:
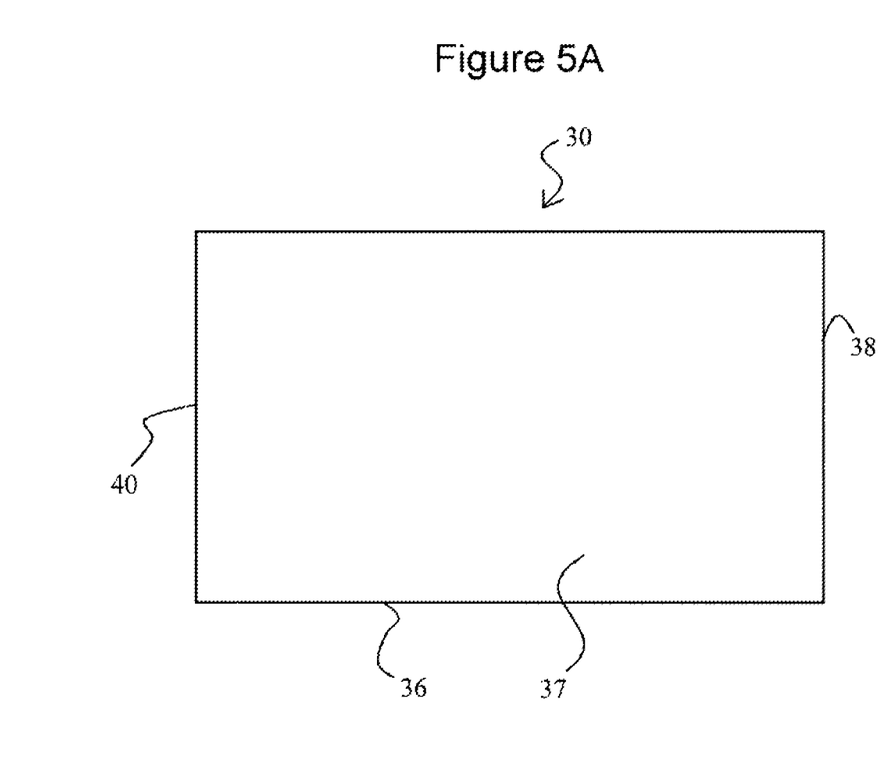
FIGS. 5A and 5B are a front elevational view and a side elevational view, respectively, of the insulating holder illustrated in FIG. 4.
Figure 5B:
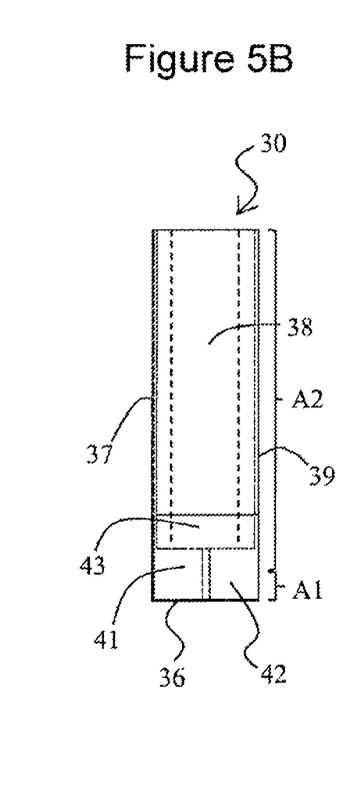

As illustrated in FIGS. 2 and 3, the insulating holder 30 is formed by folding an insulating sheet 31 that is formed of an insulating material. The insulating holder 30 is a housing body that houses the electrode body 11. FIG. 4 is a perspective view illustrating an assembled state of the insulating holder 30. FIG. 5A is a front elevational view of the insulating holder 30. FIG. 5B is a side elevational view of the insulating holder 30.

The insulating holder 30 in its assembled state has a flat substantially box shape that has a bottom and a holder opening 33 formed at the upper end thereof. In each of views from the front (FIG. 5A) and the side (FIG. 5B), the insulating holder 30 has a rectangular shape. The insulating holder 30 may have a rectangular case shape in accordance with the internal space of the outer case 60. The insulating sheet 31 that forms the insulating holder 30 may be, for example, a sheet formed of an insulating material such as a resin. For example, polypropylene or the like may be used as a resin sheet. The range of the thickness of the insulating sheet 31 is, for example, from 100 μm to 200 μm. A sheet having a thickness of, for example, 150 μm is used. The insulating holder 30 in which the electrode body 11 is housed is disposed between the outer case 60 and the electrode body 11 and electrically separates the outer case 60 and the electrode body 11 from each other.

Figure 6:
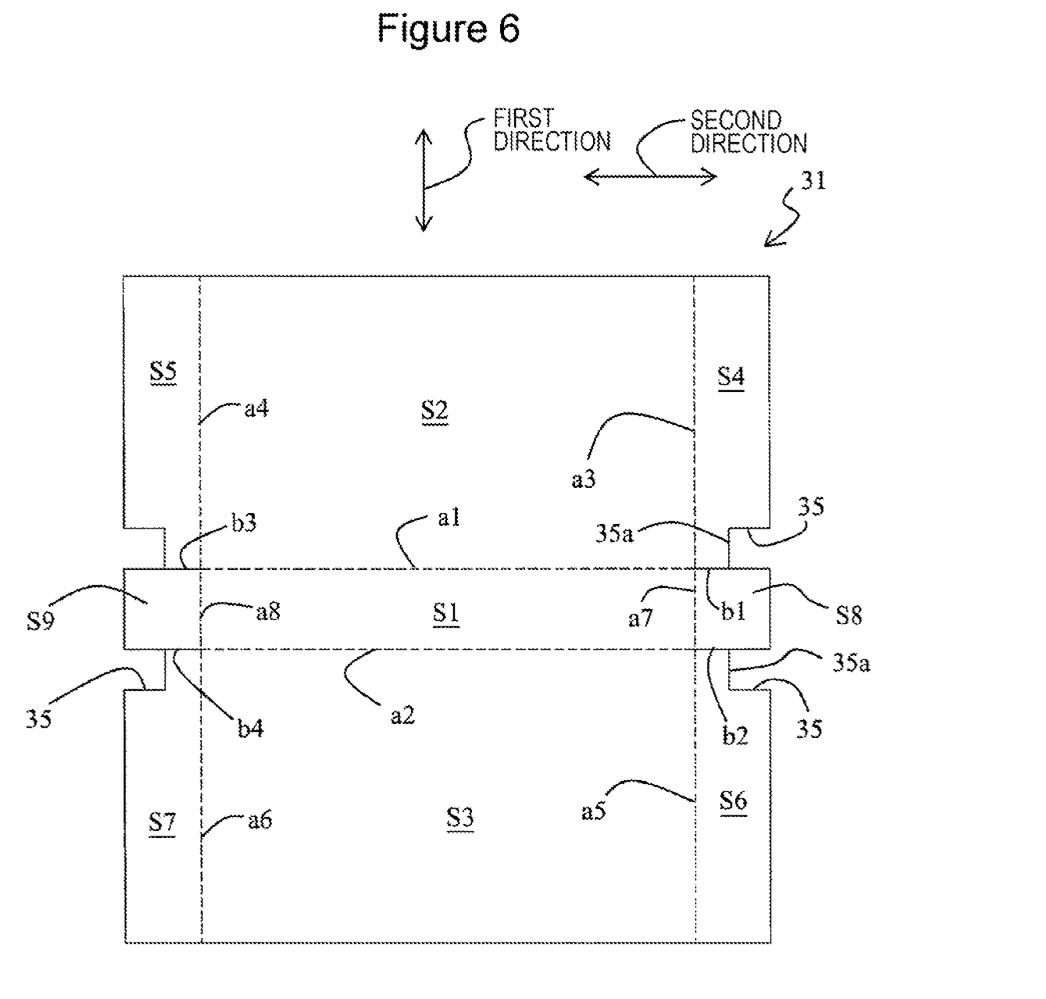
FIG. 6 is a developed view of an insulating sheet before its assembling into the insulating holder illustrated in FIG. 4.

FIG. 6 is a developed view of the insulating sheet 31 before its assembling into the insulating holder 30. The insulating sheet 31 generally has a substantially rectangular shape. The insulating sheet 31 is formed by a plurality of sheet elements that are demarcated by a plurality of folds (broken lines a1 to a6) and a plurality of slits (solid lines b1 to b4). Specifically, the insulating sheet 31 is formed by first to ninth sheet elements S1 to S9. Each of the sheet elements S1 to S9 has a rectangular shape or a substantially rectangular shape from which a portion is removed. The first sheet element S1 is positioned at the intermediate part of the insulating sheet 31 and faces the inner surface of the bottom plate portion 62 of the outer case 60 in the insulating holder 30.

The second sheet element S2 extends from one end (upper end in FIG. 6) in a first direction (up-down direction in FIG. 6) of the first sheet element S1. The third sheet element S3 extends from the other end (lower end in FIG. 6) in the first direction of the first sheet element S1.

The fourth sheet element S4 extends from one end (right end in FIG. 6) in a second direction of the second sheet element S2. The second direction is perpendicular to the first direction and parallel to the first sheet element S1. The fifth sheet element S5 extends from the other end (left end in FIG. 6) in the second direction of the second sheet element S2.

The sixth sheet element S6 extends from one end (right end in FIG. 6) in the second direction of the third sheet element S3. The seventh sheet element S7 extends from the other end (left end in FIG. 6) in the second direction of the third sheet element S3.

The eighth sheet element S8 extends from one end (right end in FIG. 6) in the second direction of the first sheet element S1. The ninth sheet element S9 extends from the other end (left end in FIG. 6) in the second direction of the first sheet element S1.

Among the first to ninth sheet elements S1 to S9, the first to third sheet elements S1 to S3 and the eighth and ninth sheet elements S8 and S9 each have a rectangular shape. In contrast, the fourth to seventh sheet elements S4 to S7 each has a rectangular shape from which a rectangular portion at an outer end in the second direction is removed at a bottom surface end that is adjacent to the eighth sheet element S8 or the ninth sheet element S9 to form a cutout 35.

Straight folds a1, a2, a3, a4, a5, and a6 are respectively formed on the border of the first and second sheet elements S1 and S2, the border of the first and third sheet elements S1 and S3, the border of the second and fourth sheet elements S2 and S4, the border of the second and fifth sheet elements S2 and S5, the border of the third and sixth sheet elements S3 and S6, and the border of the third and seventh sheet elements S3 and S7. Straight folds a7 and a8 are respectively formed on the border of the first and eighth sheet elements S1 and S8 and the border of the first and ninth sheet elements S1 and S9. Straight slits b1 and b2 are respectively formed on the border of the fourth and eighth sheet elements S4 and S8 and the border of the sixth and eighth sheet elements S6 and S8. In addition, straight slits b3 and b4 are respectively formed on the border of the fifth and ninth sheet elements S5 and S9 and the border of the seventh and ninth sheet elements S7 and S9.

To form the insulating holder 30, the first to ninth sheet elements S1 to S9 are folded at the folds a1 to a6, which are bending portions arranged on the borders therebetween.

Consequently, the insulating holder 30 has a bottom surface part 36 and four side surface parts 37 to 40. The bottom surface part 36 is formed by the first sheet element S1. The side surface parts 37 to 40 are formed by the second to ninth sheet elements S2 to S9 and vertically extend from the bottom surface part 36. The holder opening 33 surrounded by the ends of the side surface parts 37 to 40 is formed at the end of the insulating holder 30, the end being opposite to the bottom surface part 36. Among the four side surface parts 37 to 40, the two side surface parts 38 and 40 are short in lateral length and face the side end surfaces 15 and 16 (FIG. 1) of the electrode body 11, respectively. These two side surface parts 38 and 40 correspond to interposed walls.

Each of the side surface parts 38 and 40 includes first overlap sections 41 and 42 (FIG. 5) and a second overlap section 43 (FIG. 5). The first overlap sections 41 and 42 are arranged adjacent to the bottom surface part 36, and the second overlap section 43 is arranged closer than the first overlap sections 41 and 42 to the holder opening 33. In the first overlap sections 41 and 42, a plurality of the sheet elements overlap each other. In the second overlap section 43, a larger number of the sheet elements overlap each other than in each of the first overlap sections 41 and 42. The first overlap sections 41 and 42 are arranged in a first facing region A1 (FIG. 5), which will be described later. The second overlap section 43 is arranged in a second facing region A2 (FIG. 5), which will be described later.

Specifically, as illustrated in FIG. 3, the fourth sheet element S4, the sixth sheet element S6, and the eighth sheet element S8 are arranged at the same end in the second direction. Portions of the fourth, sixth, and eighth sheet elements S4, S6, and S8 overlap each other and form the side surface part 38, which is one of the aforementioned two side surface parts 38 and 40.

The fifth, seventh, and ninth sheet elements S5, S7, and S9 are arranged at the same end in the second direction. Portions of the fifth, seventh, and ninth sheet elements S5, S7, and S9 overlap each other and form the side surface part 40, which is the other one of the aforementioned two side surface parts 38 and 40.

Each of the side surface parts 38 and 40 is interposed between the outer case 60 and the side end surface 15 or 16 of the electrode body 11. Each of the side surface parts 38 and 40 has the first facing region A1 and the second facing region A2. The first facing region A1 faces the curved surface 66 of the corner portion P1 or the curved surface 67 of the corner portion P2 of the short side-wall 64 or 65 of the outer case 60. The second facing region A2 faces a portion of the short side-wall 64 or 65 of the outer case 60, the portion being away from the curved surface 66 or 67 toward the opening 61 of the outer case 60.

The first facing regions A1 and the second facing regions A2 each has a plurality of overlap sections in which some of the plurality of sheet elements overlap each other. The plurality of overlap sections include the first overlap sections 41 and 42 that are arranged in the first facing region A1 and the second overlap section 43 that is arranged in the second facing region A2. The number of overlapping sheet elements is larger in the second overlap section 43 than in each of the first overlap sections 41 and 42. Each of the first overlap sections 41 and 42 may be formed in at least a portion of the first facing region A1. Similarly, the second overlap section 43 may be formed in at least a portion of the second facing region A2.

Specifically, in the insulating holder 30, the side surface part 38 and the side surface part 40 are arranged so as to face the short side-wall 64 and the short side-wall 65, respectively, of the outer case 60. In such a configuration, it is possible to prevent the overlap sections, in which the plurality of sheet elements overlap, of the insulating holder 30 from being arranged at the opposite ends in the electrode stacking direction of the electrode body 11. Thus, in the electrode body 11, it is possible to suppress uneven stress distribution that occurs at facing surfaces of the positive electrode plates and the negative electrode plates, which makes it possible to suppress unevenness in the distance between the facing surfaces of the positive electrode and the negative electrode and to suppress unevenness in charge and discharge reactions in the electrode body 11. Therefore, it is possible to suppress unevenness in the deterioration of the positive electrode and the negative electrode of the electrode body 11.

Figure 7:
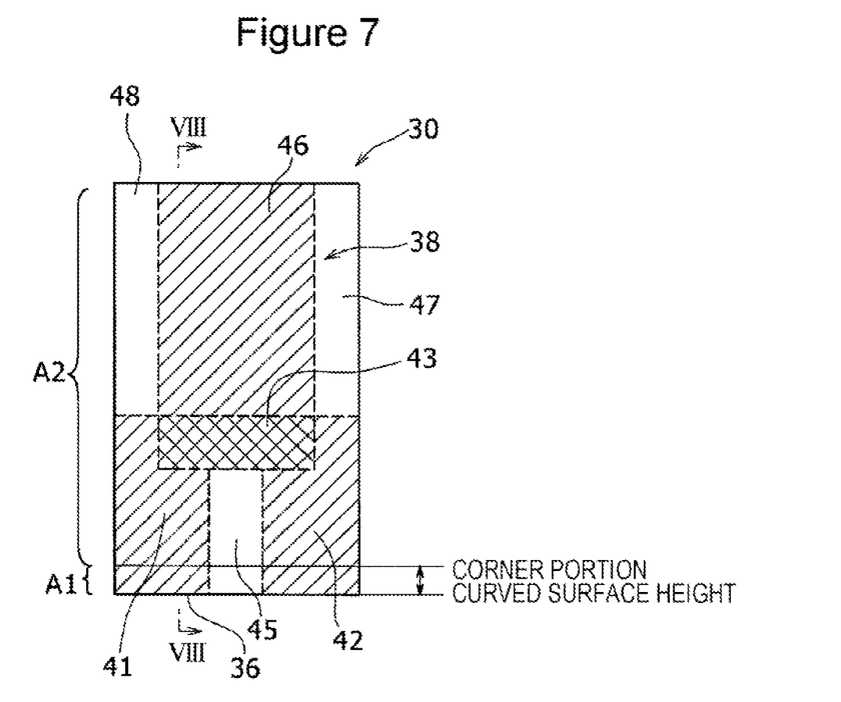
FIG. 7 is a schematic view of an outer surface of a side surface part after the assembling of the insulating holder in the first embodiment, illustrating an arrangement of overlap sections.

The plurality of overlap sections, in which the plurality of sheet elements overlap, are formed at each of the side surface parts 38 and 40 of the insulating holder 30. Hereinafter, the side surface part 38, which is one of the side surface parts 38 and 40, will be mainly described. FIG. 7 is a schematic view of an outer surface of the side surface part 38 after the assembling of the insulating holder 30 in the first embodiment, illustrating an arrangement of the overlap sections. The side surface part 38 is formed by folding the insulating sheet 31 such that portions thereof overlap each other, as described above. At the side surface part 38, the plurality of overlapping sections are arranged. Referring to FIG. 7, an oblique lattice part indicates an overlap section in which three sheet elements overlap each other, oblique line parts each indicate an overlap section in which two sheet elements overlap each other, and white parts each indicate a single layer section in which only one sheet element is arranged.

As illustrated in FIG. 3, the cutout 35 is formed at the bottom-side end of each of the fourth sheet element S4 and the sixth sheet element S6. The fourth sheet element S4 and the eighth sheet element S8 overlap the sixth sheet element S6. As illustrated in FIG. 6, in a developed state, a second-direction length of the eighth sheet element S8 is shorter than the first-direction length of each of the fourth and eighth sheet elements S4 and S8 and longer than the first-direction length of each cutout 35. Thus, a single layer section 45 formed by only the eighth sheet element S8 is arranged at a width-direction center portion of the bottom-side end of the side surface part 38, and the first overlap section 42 in which the fourth sheet element S4 and the eighth sheet element S8 overlap each other and the first overlap section 41 in which the sixth sheet element S6 and the eighth sheet element S8 overlap each other are arranged at width-direction opposite ends. In addition, the second overlap section 43 in which the fourth, sixth, and eighth sheet elements S4, S6, and S8 overlap each other is arranged at the width-direction center portion of the bottom-side end of the side surface part 38, the second overlap section 43 being on the holder opening side (upper side in FIG. 7) of the single layer section 45. The largest number of the sheet elements overlap in the second overlap section 43.

On the opening side of the side surface part 38, an overlap section 46 in which the fourth sheet element S4 and the sixth sheet element S6 overlap each other is arranged in a wide region of a width-direction intermediate portion of the side surface part 38, and single layer sections 47 and 48 formed by only the fourth sheet element S4 or the sixth sheet element S6 are arranged at width-direction opposite ends of the side surface part 38.

As described above, on the bottom side of the side surface part 38, the single layer section 45 is surrounded by the overlap sections 41, 42, and 43 and the fold a7 that forms the border of the first sheet element S1 and the eighth sheet element S8. Consequently, a function of electrically insulating the electrode body 11 and the outer case 60 from each other is improved, which prevents a short circuit between the electrode body 11 and the outer case 60 from easily occurring.

The largest number of the overlapping sheet elements is two, in each of the first overlap sections 41 and 42, at the bottom-side end of the side surface part 38. The largest number of the sheet elements that overlap at the opening side portion is three, in the second overlap section 43, on the bottom side of the side surface part 38. The bottom-side end of the side surface part 38 is arranged in the first facing region A1, which faces the curved surface 66 of the corner portion P1 of the short side-wall 64 of the outer case 60. An opening side of the bottom side portion of the side surface part 38 is arranged in the second facing region A2, which faces the portion away from the curved surface 66 of the short side-wall 64 of the outer case 60 toward the opening. Consequently, the number of the overlapping sheet elements is larger in the second overlap section 43 arranged in the second facing region A2 than in the first overlap sections 41 and 42 arranged in the first facing region A1. As a result, it is possible to reduce the number of the overlapping sheet elements at the side surface part 38, which faces the curved surface 66 of the outer case 60. Thus, it is possible to suppress stress concentration in the electrode body 11 when the edge portions of the insulating holder 30 are brought into contact with the curved surface 66 of the corner portion P1 of the outer case 60 as a result of housing the insulating holder 30 and the electrode body 11 in the outer case 60. Moreover, it is possible to increase the volume ratio of a portion that contributes to power generation of the electrode body 11 with respect to the outer case 60.

Similarly to the side surface part 38 described above, the side surface part 40 also prevents a short circuit between the electrode body 11 and the outer case 60 from easily occurring. At the same time, it is possible to suppress stress concentration in the electrode body 11 by housing the insulating holder 30 and the electrode body 11 inside the outer case 60.

Further, the eighth and ninth sheet elements S8 and S9 are formed so as to extend toward both sides in the second direction from the first sheet element S1, which faces the bottom plate portion 62 of the electrode body 11, thereby preventing formation of a gap between the bottom surface of the insulating holder 30 and each of the side surface parts 38 and 40. Consequently, it is possible to improve insulation between the electrode body 11 and the outer case 60 at the bottom-side end.

Figure 8:
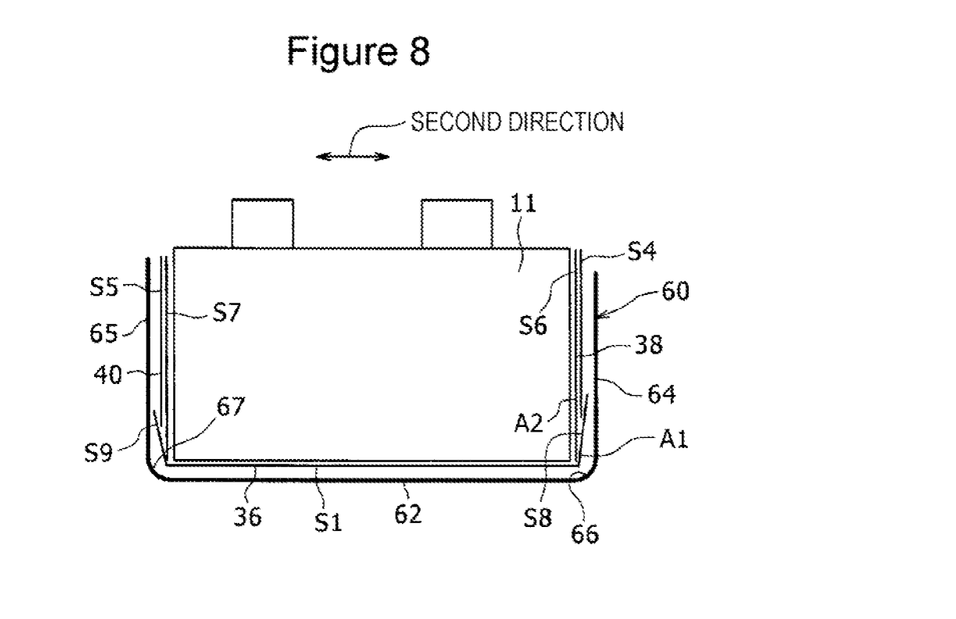
FIG. 8 is a sectional view taken along the line VIII-VIII in FIG. 7, schematically illustrating an electrode body, the insulating holder, and the outer case of the power storage device according to the first embodiment.

FIG. 8 is a sectional view taken long the line VIII-VIII in FIG. 7, schematically illustrating the electrode body 11, the insulating holder 30, and the outer case 60 of the power storage device in the first embodiment. As illustrated in FIG. 8, it is possible to arrange the overlap section, in which the number of the overlapping sheet elements is the largest, at a position in each of the side surface parts 38 and 40 away from the curved surface 66 or 67 toward the opening. Consequently, the overlap sections in which the number of the overlapping sheet elements is comparatively less are arranged at each of the bottom-side ends of the side surface parts 38 and 40. Thus, it is possible to reduce, in the electrode body 11, a stress that is generated in the first facing regions A1, which face the curved surface 66 or 67 of the corner portions.

Figure 9:
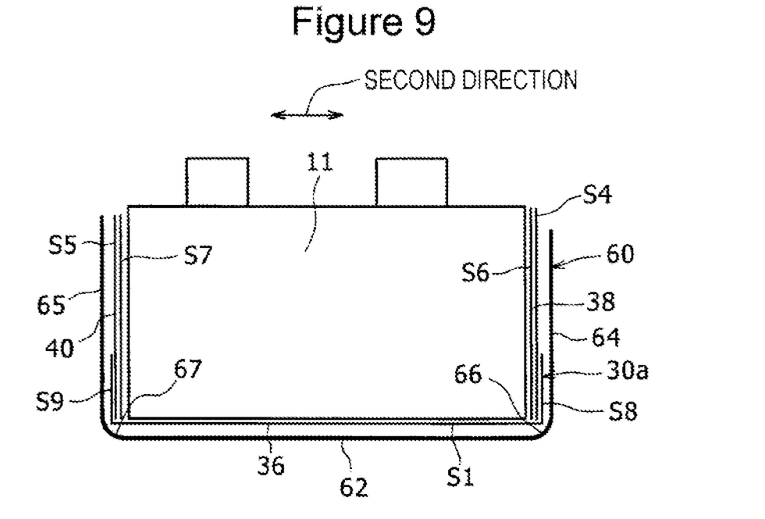
FIG. 9 is a view corresponding to FIG. 8, illustrating a power storage device according to a comparative example.

FIG. 9 is a view corresponding to FIG. 8, illustrating a power storage device according to a comparative example. In the comparative example illustrated in FIG. 9, differently from the first embodiment, in a state in which the insulating holder is developed, the fourth, fifth, sixth, and seventh sheet elements S4, S5, S6, and S7 include no cutout and each has a rectangular shape. Even in such a comparative example, similarly to the first embodiment, the eighth and ninth sheet elements S8 and S9 are formed so as to extend toward both sides in the second direction from the first sheet element S1, which faces the bottom plate portion 62 of the electrode body 11, thereby preventing formation of a gap between the bottom surface part 36 and each of the side surface parts 38 and 40 in order to improve insulation between the electrode body 11 and the outer case 60 at the bottom-side end. However, as illustrated in FIG. 9, an insulating holder 30a that is formed by such an insulating sheet tends to be in a state in which the largest number of sheet elements overlap at each bottom-side end of the side surface parts 38 and 40. Consequently, if the electrode body 11 and the insulating holder 30a in this state are housed in the outer case 60 in which the curved surfaces 66 and 67 are formed at the corner portions, the curved surfaces would easily come into contact with portions in which the number of the overlapping sheet elements is the largest. As a result, uneven stress distribution easily occurs in the electrode body 11 at portions that face the portions in which the number of the overlapping sheet elements is the largest. In the first embodiment, it is possible to prevent such inconvenience.

In the first embodiment, in each of the side surface parts 38 and 40, the cutout 35 is formed at the bottom-side end of each of the fourth, fifth, sixth, and seventh sheet elements S4, S5, S6, and S7. The cutouts 35 form the single layer section 45 in which the fourth, sixth, and eighth sheet elements S4, S6, and S8 do not overlap and a single layer section in which the fifth, seventh, and ninth sheet elements S5, S7, and S9 do not overlap, thereby preventing overlap sections from being formed at the bottom-side ends. In addition, as is in the embodiment illustrated in FIG. 6, a bending portion-side edge 35*a* of each cutout 35 may be separated by a predetermined distance from the fold a3 between the second and fourth sheet elements S2 and S4 or the fold a5 between the third and sixth sheet elements S3 and S6 and from the fold a4 between the second and fifth sheet elements S2 and S5 or the fold a6 between the third and seventh sheet elements S3 and S7. In such a configuration, a portion of the sheet elements remains throughout the folds. Thus, it is possible to easily form the overlap sections for ensuring insulation while forming the aforementioned single layer sections. The peripheral edge of each cutout 35 has a step shape that is formed by connecting straight lines; however, the peripheral edge of each cutout 35 is not limited thereto. The peripheral edge of each cutout may have a curved shape. Moreover, the peripheral edge of each cutout has a linear shape that is oblique in the up-down direction of the side surface parts 38 and 40. Further, only one of the fourth, sixth, and eighth sheet elements S4, S6, and S8 may be provided with the cutout. Similarly, only one of the fifth, seventh, and ninth sheet elements S5, S7, and S9 may be provided with the cutout. In addition to the method of forming the cutout 35 by removing a portion of each sheet element, the cutout 35 may be formed by turning back and folding a portion of each sheet element that corresponds to the cutout 35, with a portion of the peripheral edge of the cutout as a starting point of bending. The folds a1 to a8 that demarcate the first to ninth sheet elements S1 to S9 are indicated by broken lines in FIG. 6. However, the folds a1 to a8 may be continuous linear grooves formed in the insulating sheet 31. The grooves are capable of increasing insulation of the folds a1 to a8 in the insulating holder 30.

As described above, according to the power storage device 10 of the present disclosure, it is possible to arrange the overlap sections, in which the number of the overlapping sheet elements of the insulating holder 30 is the largest, at positions away from the curved surfaces of the side surface parts 38 and 40, which face the curved surface 66 and the curved surface 67, respectively, of the corner portions of the outer case 60 of the insulating holder 30. Consequently, it is possible to suppress stress concentration in the electrode body 11 without complicating the shape of the assembled insulating holder 30.

Figure 10:
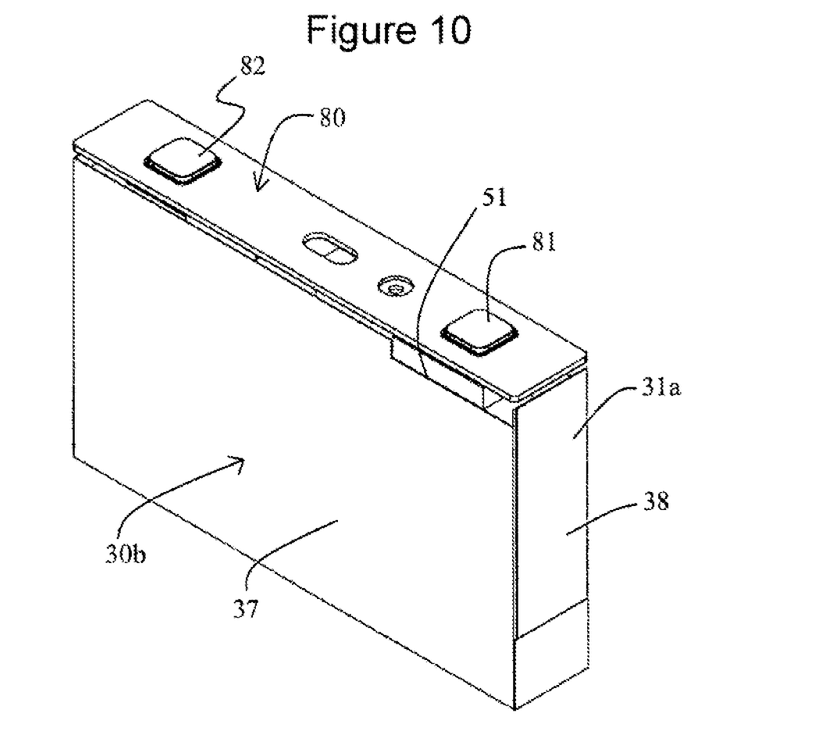
FIG. 10 is a view corresponding to FIG. 2, illustrating a second embodiment.
Figure 11:
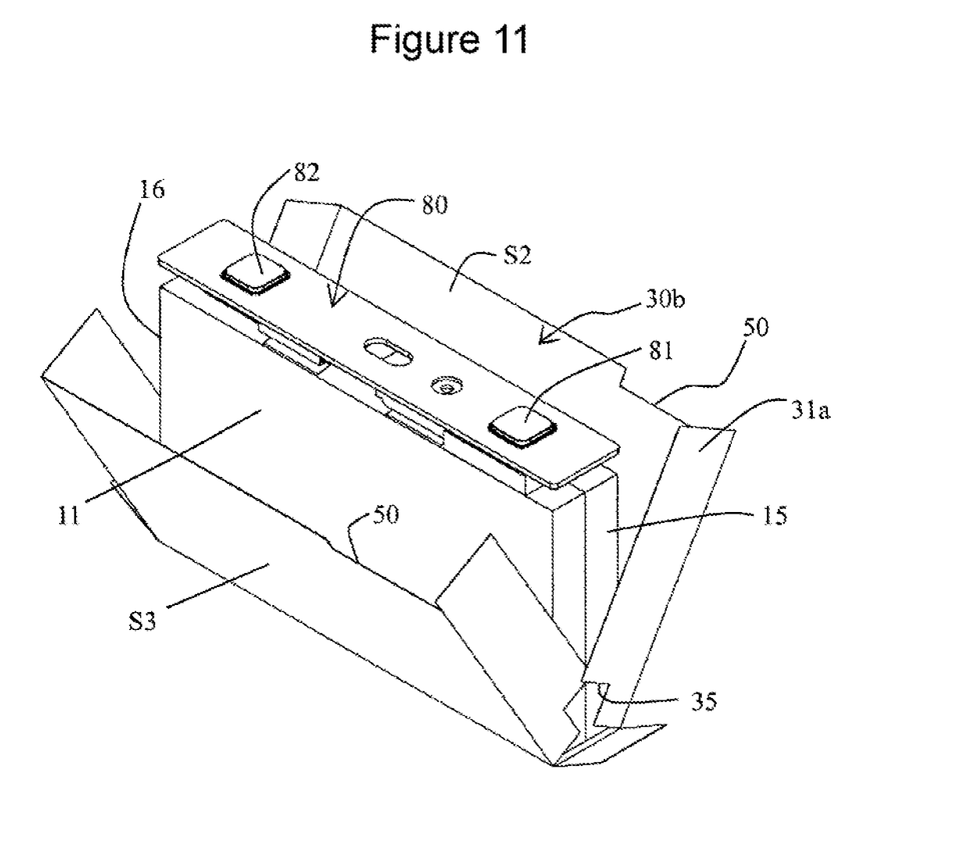
FIG. 11 is a view corresponding to FIG. 3, illustrating the second embodiment.
Figure 12:
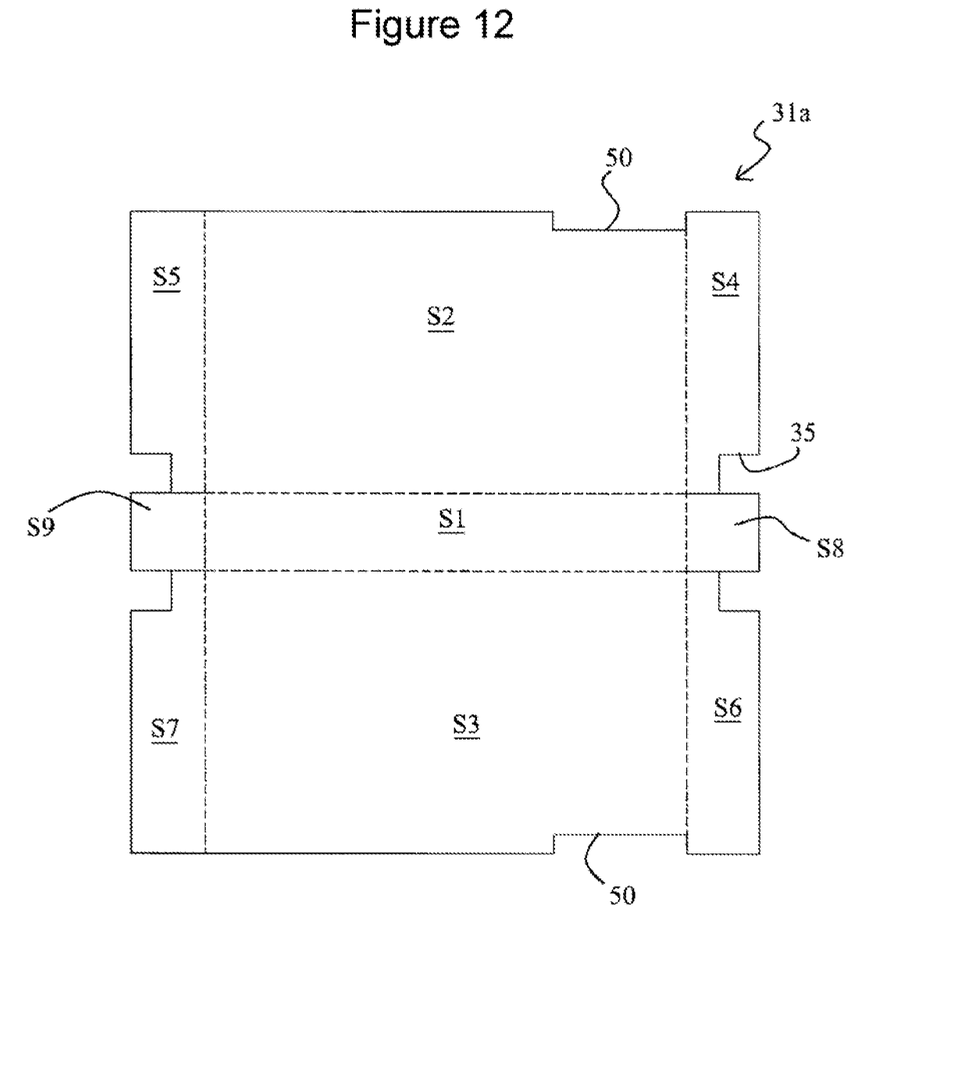
FIG. 12 is a view corresponding to FIG. 6, illustrating the second embodiment.

FIG. 10 is a view corresponding to FIG. 2, illustrating a second embodiment. FIG. 11 is a view corresponding to FIG. 3, illustrating the second embodiment. FIG. 12 is a view corresponding to FIG. 6, illustrating the second embodiment.

In the second embodiment, as illustrated in each of FIGS. 11 and 12, in an insulating sheet 31*a* that forms an insulating holder 30*b*, a rectangular cutout 50 is formed at one opening end in a lateral direction of each of the second and third sheet elements S2 and S3. Consequently, in a state in which the insulating holder 30 is assembled as illustrated in FIG. 10, each cutout 50 forms a window portion 51 at a portion on the opening side of each of two wall surfaces that are positioned stacking-direction opposite ends of the electrode body 11. The window portions 51 are positioned at the same end in the longitudinal direction. Other configurations and effects are the same as those in the configurations in FIGS. 1 to 8.

In each of the embodiments described above, the electrode body of the power storage device is a stacked type; however, the electrode body of the power storage device is not limited thereto. For example, the electrode body may be formed by stacking a long positive electrode plate and a long negative electrode plate on each other via a long separator, winding these electrode plates in the stacked state into a cylindrical shape to obtain a wound electrode body, and pressing a side surface of the wound electrode body such that the wound electrode body is molded into a flat shape. Even when the electrode body is such a wound type, the configurations of the present disclosure is applicable thereto.

While detailed embodiments have been used to illustrate the present invention, to those skilled in the art, however, it will be apparent from the foregoing disclosure that various changes and modifications can be made therein without departing from the spirit and scope of the invention. Furthermore, the foregoing description of the embodiments according to the present invention is provided for illustration only, and is not intended to limit the invention.

What is claimed is:

1. A power storage device comprising:
an electrode body that includes at least one positive electrode plate and at least one negative electrode plate that are stacked on each other via a separator;
an insulating holder that is formed by folding a sheet formed of an insulating material and that houses the electrode body; and
an outer case that houses the electrode body together with the insulating holder and an electrolytic solution,
wherein the outer case includes a bottom plate portion, a plurality of side walls that extend vertically from the bottom plate portion, and an opening formed at an end opposite to the bottom plate portion,
wherein a corner portion that connects an inner surface of one side wall of the plurality of side walls and an inner surface of the bottom plate portion to each other has a curved surface,
wherein the electrode body has a side end surface that is parallel to a stacking direction and that faces the one side wall via the insulating holder,
wherein the insulating holder has an interposed wall interposed between the side end surface and the outer case,
wherein the interposed wall has a first facing region that faces the curved surface of the corner portion of the one side wall and a second facing region that faces a portion of the one side wall, the portion being away from the curved surface toward the opening,
wherein the sheet includes a plurality of sheet elements,
wherein each of the first facing region and the second facing region has a plurality of overlap sections in which some of the plurality of sheet elements overlap each other, and
wherein the plurality of the overlap sections include an overlap section arranged in the first facing region and an overlap section arranged in the second facing region, and the number of the sheet elements that overlap each other is larger in the overlap section arranged in the second facing region than in the overlap section arranged in the first facing region,
wherein the sheet of the insulating holder includes
a first sheet element that faces the bottom plate portion of the outer case,
a second sheet element and a third sheet element that extend from opposite ends in a first direction of the first sheet element,
a fourth sheet element and fifth sheet element that extend from opposite ends in a second direction of the second sheet element, the second direction being perpendicular to the first direction and parallel to the first sheet element, a sixth sheet element and a seventh sheet element that extend from opposite ends in the second direction of the third sheet element, and an eighth sheet element and a ninth sheet element that extend from opposite ends in the second direction of the first sheet element, wherein each of the first to ninth sheet elements is folded at a bending portion that is arranged at respective borders of the first to ninth sheet elements, wherein the fourth sheet element, the sixth sheet element, and the eighth sheet element are arranged at a same end in the second direction and form the interposed wall, wherein each of the fourth sheet element, the fifth sheet element, the sixth sheet element, and the seventh sheet element includes a cutout portion, and wherein the cutout portion includes a peripheral edge extending in a different direction from the first direction, wherein each of the fourth sheet element, the fifth sheet element, the sixth sheet element, and the seventh sheet element includes a step shape formed at a peripheral edge thereof, wherein edges of the eighth sheet element in the first direction separate from the fourth sheet element and the sixth sheet element, wherein the peripheral edges of the fourth sheet element, the fifth sheet element, the sixth sheet element, and the seventh sheet element are located at a one end nearer to the first sheet element than the other end in a direction perpendicular to the first sheet element, wherein an entirety of the peripheral edges of the cutout portions in the fourth sheet element and the sixth sheet element is overlapped with the eighth sheet element in the second direction where the sheet of the insulating holder is folded, and wherein an entirety of the peripheral edges of the cutout portions in the fifth sheet element and the seventh sheet element is overlapped with the ninth sheet element in the second direction where the sheet of the insulating holder is folded.

2. The power storage device according to claim 1, wherein at least one of the fourth, sixth, and eighth sheet elements includes a cutout portion.

3. The power storage device according to claim 2, wherein the bending portion has a linear shape, and wherein the cutout portion has an edge that is positioned at a side end of the bending portion, the edge and the bending portion being separated from each other by a predetermined distance.

4. The power storage device according to claim 3, wherein the interposed wall has a single layer section in a portion of one of the fourth, sixth, and eighth sheet elements, the single layer section not overlapping remaining sheet elements, and
wherein the single layer section is surrounded by the bending portion and the plurality of overlap sections.

5. The power storage device according to claim 2, wherein, in the overlap section arranged in the second facing region, the fourth sheet element, the sixth sheet element, and the eighth sheet element overlap each other.

6. The power storage device according to claim 1, wherein the fourth sheet element further includes, at an end thereof adjacent to the first sheet element, a straight slit that aligns with the first sheet element where the sheet of the insulating holder is folded, and
a wider slit than the straight slit, which connects with an end of the straight slit, wherein the end of the straight slit is further than the other end of the straight slit from a boundary between the second sheet element and the fourth sheet element, and
wherein the straight slit is substantially parallel to the first sheet element where the sheet of the insulating holder is folded.

7. The power storage device according to claim 1, wherein the eighth sheet element is positioned outward and closer to the outer case than the fourth sheet element and the sixth sheet element, and the ninth sheet element is positioned outward and closer to the outer case than the third sheet element and the seventh sheet element.

8. The power storage device according to claim 1, wherein the interposed wall has a single layer section formed of a single sheet element not overlapping remaining sheet elements, the single layer section having a rectangular shape, and
wherein a pair of overlap sections in which two sheet elements overlap each other are formed on opposite sides of the single layer section.

9. The power storage device according to claim 1, wherein the interposed wall has an overlap section having a rectangular shape in which three sheet elements overlap each other.

10. An insulating holder formed by folding a sheet that is formed of an insulating material, the sheet including a plurality of sheet elements, the insulating holder comprising:
a bottom surface part; and
a plurality of side surface parts that extend vertically from the bottom surface part,
wherein a holder opening surrounded by ends of the side surface parts is formed at an end of the insulating holder opposite to the bottom surface part, and
wherein at least one of the plurality of side surface parts includes a first overlap section in which the plurality of sheet elements overlap each other and a second overlap section in which a larger number of the sheet elements overlap each other than in the first overlap section, the first overlap section being arranged adjacent to the bottom surface part, the second overlap section being arranged closer than the first overlap section to the holder opening,
wherein the sheet of the insulating holder includes
a first sheet element,
a second sheet element and a third sheet element that extend from opposite ends in a first direction of the first sheet element,
a fourth sheet element and fifth sheet element that extend from opposite ends in a second direction of the second sheet element, the second direction being perpendicular to the first direction and parallel to the first sheet element,
a sixth sheet element and a seventh sheet element that extend from opposite ends in the second direction of the third sheet element, and
an eighth sheet element and a ninth sheet element that extend from opposite ends in the second direction of the first sheet element,
wherein each of the first to ninth sheet elements is folded at a bending portion that is arranged at respective borders of the first to ninth sheet elements,
wherein the fourth sheet element, the sixth sheet element, and the eighth sheet element are arranged at a same end in the second direction,
wherein each of the fourth sheet element, the fifth sheet element, the sixth sheet element, and the seventh sheet element includes a cutout portion, and wherein the cutout portion includes a peripheral edge extending in a different direction from the first direction, wherein each of the fourth sheet element, the fifth sheet element, the sixth sheet element, and the seventh sheet element includes a step shape formed at a peripheral edge thereof, wherein edges of the eighth sheet element in the first direction separate from the fourth sheet element and the sixth sheet element, wherein the peripheral edges of the fourth sheet element, the fifth sheet element, the sixth sheet element, and the seventh sheet element are located at a one end nearer to the first sheet element than the other end in a direction perpendicular to the first sheet element, wherein an entirety of the peripheral edges of the cutout portions in the fourth sheet element and the sixth sheet element is overlapped with the eighth sheet element in the second direction where the sheet of the insulating holder is folded, and wherein an entirety of the peripheral edges of the cutout portions in the fifth sheet element and the seventh sheet element is overlapped with the ninth sheet element in the second direction where the sheet of the insulating holder is folded.

* * * * *